US012769593B2

(12) United States Patent
Kim et al.

(10) Patent No.: US 12,769,593 B2
(45) Date of Patent: Oct. 20, 2026

(54) MASTER ELECTRONICS APPARATUS, ELECTRONIC APPARATUS AND CONTROLLING METHOD THEREOF

(71) Applicant: SAMSUNG ELECTRONICS CO., LTD., Suwon-si (KR)

(72) Inventors: Jooyoo Kim, Suwon-si (KR); Chanhyung Kong, Suwon-si (KR); Kyungjae Kim, Suwon-si (KR); Jongyoub Ryu, Suwon-si (KR); Hyungseon Song, Suwon-si (KR); Dongjun Shin, Suwon-si (KR); Miyoung Yoo, Suwon-si (KR); Yoonhee Choi, Suwon-si (KR); Jaeyun Pyo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 646 days.

(21) Appl. No.: 17/832,014

(22) Filed: Jun. 3, 2022

(65) Prior Publication Data

US 2023/0047922 A1 Feb. 16, 2023

Related U.S. Application Data

(63) Continuation of application No. PCT/KR2022/004914, filed on Apr. 6, 2022.

(30) Foreign Application Priority Data

Aug. 12, 2021 (KR) ........................ 10-2021-0106673

(51) Int. Cl.
*G06F 9/50* (2006.01)

(52) U.S. Cl.
CPC .......... *G06F 9/5094* (2013.01); *G06F 9/5033* (2013.01); *G06F 9/5038* (2013.01); *G06F 9/5044* (2013.01)

(58) Field of Classification Search
CPC .... G06F 9/5094; G06F 9/5033; G06F 9/5038; G06F 9/5044; G06F 9/4893;
(Continued)

(56) References Cited

U.S. PATENT DOCUMENTS 9,236,741 B2 1/2016 Jang et al.
9,253,793 B2 2/2016 Wang et al.
(Continued)

FOREIGN PATENT DOCUMENTS

JP 6163355 7/2017
KR 10-0725178 B1 6/2007
(Continued)

OTHER PUBLICATIONS

International Search Report dated Jul. 21, 2022 in International Patent Application No. PCT/KR2022/004914 (3 pages; 3 pages English translation).

(Continued)

*Primary Examiner* — Pierre Vital
*Assistant Examiner* — Tuan M Nguyen
(74) *Attorney, Agent, or Firm* — STAAS & HALSEY LLP

(57) ABSTRACT

A master electronic apparatus, an electronic apparatus, and a controlling method thereof where the master electronic apparatus includes a communication interface and a processor. The processor receives first data and second data regarding predicted power consumption amounts corresponding to respective tasks of a first electronic apparatus and a second electronic apparatus, calculates summed-up values of the predicted power consumption amounts for respective times, and compares the summed-up values with instantaneous power amount limits for the respective times. The processor, based on the summed-up values being smaller than the instantaneous power amount limits, transmits a task (Continued)

approval signal to the second electronic apparatus, and based on identifying a time a summed-up value is greater than or equal to the instantaneous power amount limit, transmits a control signal controlling an operation in the identified time to at least one of the first electronic apparatus and the second electronic apparatus based on priorities.

15 Claims, 15 Drawing Sheets

(58) Field of Classification Search
CPC . Y02B 70/322; Y02B 70/3225; Y04S 20/222; H02J 3/00; H02J 13/00; H02J 2105/42; H02J 2105/52; H02J 2105/61; H02J 3/003; H02J 13/13; Y10S 320/11
See application file for complete search history.

(56) References Cited

U.S. PATENT DOCUMENTS

| | | | | |
|---|---|---|---|---|
| 9,924,459 | B2 | 3/2018 | Park et al. | |
| 10,491,001 | B2 | 11/2019 | Lim et al. | |
| 10,642,236 | B2 | 5/2020 | Ohama et al. | |
| 2005/0099314 | A1 * | 5/2005 | Aisa | H02J 3/14 340/637 |
| 2011/0098869 | A1 * | 4/2011 | Seo | H04L 41/0833 700/296 |
| 2011/0145611 | A1 * | 6/2011 | Lee | H02J 3/381 713/320 |
| 2012/0150359 | A1 * | 6/2012 | Westergaard | G06Q 10/06313 700/291 |
| 2012/0197451 | A1 * | 8/2012 | Jang | G06Q 10/063 713/320 |
| 2013/0008893 | A1 * | 1/2013 | Little | H05B 6/681 219/702 |
| 2013/0082526 | A1 * | 4/2013 | Lee | H02J 13/00004 307/31 |
| 2014/0105584 | A1 * | 4/2014 | Flohr | G06Q 50/06 392/441 |
| 2016/0066268 | A1 | 3/2016 | Park et al. | |
| 2018/0034273 | A1 * | 2/2018 | Imai | G05B 15/02 |
| 2018/0183238 | A1 | 6/2018 | Lim et al. | |
| 2018/0196490 | A1 * | 7/2018 | Ail | G06F 1/3287 |
| 2019/0123580 | A1 * | 4/2019 | Bindea | G05B 13/026 |
| 2022/0121235 | A1 * | 4/2022 | Ise | G06Q 30/0206 |

FOREIGN PATENT DOCUMENTS

| | | |
|---|---|---|
| KR | 10-0956639 | 5/2010 |
| KR | 10-1081464 B1 | 11/2011 |
| KR | 10-1286587 B1 | 8/2013 |
| KR | 10-1595301 | 2/2016 |
| KR | 10-2016-0140266 | 12/2016 |
| KR | 10-1764612 B1 | 8/2017 |
| KR | 10-1898642 | 9/2018 |
| KR | 10-2067007 B1 | 3/2020 |
| KR | 10-2188306 | 12/2020 |

OTHER PUBLICATIONS

Written Opinion dated Jul. 21, 2022 in International Patent Application No. PCT/KR2022/004914 (4 pages; 4 pages English translation).
Korean Office Action issued Sep. 8, 2025 for Application No. 10-2021-0106673.
Korean Office Action issued May 20, 2026 for Application No. 10-2021-0106673.

* cited by examiner

FIG. 10A

| SAVED POWER AMOUNT | SAVED POWER AMOUNT | CONTENT |
|---|---|---|
| LEVEL 1 | 2Wh | DELAY OF THE OPERATION OF THE AIR DRESSER |
| LEVEL 2 | 4Wh | DR LEVEL 2 OF THE WASHING MACHINE |
| LEVEL 3 | 6Wh | DR LEVEL 2 OF THE WASHING MACHINE AND THE DRYING MACHINE |
| LEVEL 4 | 8Wh | DR LEVEL 3 OF THE AIR DRESSER, THE WASHING MACHINE AND THE DRYING MACHINE |
| ... | ... | ... |
| LEVEL 19 | 25Wh | ... |
| LEVEL 20 | 30Wh | MAXIMUM SAVING OF THE POWER AMOUNTS OF THE AIR DRESSER, THE WASHING MACHINE AND THE DRYING MACHINE, THE AIR CONDITIONER, THE AIR PURIFIER, AND THE DISHWASHER |

FIG. 10B

| | CONSTITUTION OF POWER AMOUNT | CONTENT |
|---|---|---|
| AIR CONDITIONER | LEVEL 2 | DRIVING THE OUTDOOR FAN, DRIVING AT THE SET TEMPERATURE |
| AIR PURIFIER | LEVEL 2 | SENSING THE AIR QUALITY, AIR PURIFYING DRIVING |
| REFRIGERATOR | LEVEL 1 | MAINTAINING THE SET TEMPERATURE |
| WASHING MACHINE | LEVEL 3 | SETTING THE WATER TEMPERATURE, WASHING, SPIN-DRYING |
| DRYING MACHINE | LEVEL 2 | SENSING THE WEIGHT, DRYING |
| AIRDRESSER | LEVEL 2 | SENSING, CLOTHES CARE |
| INDUCTION | LEVEL 2 | PREHEATING, DRIVING AT THE SET TEMPERATURE |
| OVEN | LEVEL 2 | PREHEATING, DRIVING AT THE SET TEMPERATURE |
| DISHWASHER | LEVEL 2 | WASHING, DRYING |

FIG. 10C

| | USE CYCLE | USE TIME | WHETHER USER IS INVOLVED | WHETHER HEALTH IS RELATED | POSSIBILITY OF DELAY | POWER AMOUNT | USABILITY IN THE CURRENT TIME | USABILITY IN THE NEXT TIME | PRIORITY |
|---|---|---|---|---|---|---|---|---|---|
| AIR CONDITIONER | 0.7/DAY | 2.4h/DAY | - | × | ○ (THERMAL DISCOMFORT) | MEDIUM | 0.5 | 0.5 | 5 |
| AIR PURIFIER | 0.7/DAY | 2.4h/DAY | - | ○ | ○ (FINE DUST) | SMALL | 0.4 | 0.6 | 6 |
| REFRIGERATOR | ALWAYS ON | - | - | ○ | × | SMALL | 0.1 | 0.1 | 7 |
| WASHING MACHINE | 0.7/DAY | 2.4h/DAY | LAUNDRY IN/OUT | × | ○ (MAXIMUM 2 HOURS) | MEDIUM | 0.8 | 0.5 | 2 |
| DRYING MACHINE | 0.7/DAY | 2.4h/DAY | SUBJECTS FOR DRYING IN/OUT | × | ○ (MAXIMUM 1 HOURS) | MEDIUM | 0.7 | 0.8 | 3 |
| AIRDRESSER | 0.7/DAY | 2.4h/DAY | CLOTHES IN/OUT | × | ○ (MAXIMUM 3 HOURS) | MEDIUM | 0.9 | 0.9 | 1 |
| INDUCTION | 0.7/DAY | 2.4h/DAY | ALWAYS | × | × | BIG | 0.2 | 0.1 | 9 |
| OVEN | 0.7/DAY | 2.4h/DAY | COOKING IN/OUT | × | × | MEDIUM | 0.1 | 0.1 | 8 |
| DISHWASHER | 0.7/DAY | 2.4h/DAY | TABLEWARE IN/OUT | × | ○ (MAXIMUM 5 HOURS) | MEDIUM | 0.5 | 0.8 | 4 |

MASTER ELECTRONICS APPARATUS, ELECTRONIC APPARATUS AND CONTROLLING METHOD THEREOF

CROSS-REFERENCE TO RELATED APPLICATIONS

This application is a continuation application, under 35 U.S.C. § 111(a), of International Patent Application No. PCT/KR2022/004914, filed on Apr. 6, 2022, which claims the claims benefit of priority to Korean Patent Application No. 10-2021-0106673, filed on Aug. 12, 2021, in the Korean Intellectual Property Office, the disclosures of which are incorporated by reference herein in their entirety.

BACKGROUND

1. Field

The disclosure relates to a master electronic apparatus, an electronic apparatus, and a controlling method thereof, and more particularly, to a master electronic apparatus that manages a consumed power amount, an electronic apparatus, and a controlling method thereof.

2. Description of the Prior Art

Recently, various electronic apparatuses are being distributed. For example, in a home, a lot of electronic apparatuses such as a TV, a refrigerator, a washing machine, a drying machine, a microwave oven, etc. are arranged. As electronic apparatuses in a home increase, the consumed power amount of the entire electronic apparatuses increases. However, the total power amount allowed for a home cannot change greatly. Accordingly, in case the power amount consumed by the entire electronic apparatuses exceeds the allowed total power amount, a blackout may occur.

If a blackout occurs, not only an operation of an electronic apparatus may be stopped, but also a lot of problems may be caused. For example, as an operation of a health-related apparatus is stopped, a human life may be in danger, and as an operation of a refrigerator is stopped, food may go bad.

For resolving the aforementioned problem, a lot of methods of managing a consumed power amount have been researched. However, as conventional methods manage a power amount based on the total consumed power amount of an electronic apparatus and the allowed total power amount, there is a problem that efficiency is poor.

Accordingly, there is a need for a method of effectively managing a consumed power amount.

SUMMARY

A master electronic apparatus according to an embodiment of the disclosure includes a communication interface and a processor. The processor is configured to receive, through the communication interface, first data regarding predicted power consumption amounts for respective tasks of a first electronic apparatus and second data regarding predicted power consumption amounts for respective tasks of a second electronic apparatus which are expected to be newly performed, calculate summed-up values of the predicted power consumption amounts for respective times based on the first data and the second data, and compare the summed-up values with instantaneous power amount limits for the respective times, and based on the summed-up values being smaller than the instantaneous power amount limits during the respective times in entirety, transmit a task approval signal to the second electronic apparatus through the communication interface, and based on identifying a time a summed-up value is greater than or equal to the instantaneous power amount limit, transmit a control signal controlling an operation in the identified time to at least one of the first electronic apparatus and the second electronic apparatus based on priorities through the communication interface.

An electronic apparatus according to an embodiment of the disclosure includes a communication interface performing communication with an external apparatus performing a plurality of tasks and a processor, wherein the processor is configured to receive first data regarding predicted power consumption amounts for respective tasks from the external apparatus through the communication interface, identify second data regarding predicted power consumption amounts for a plurality of respective tasks that can be performed in the electronic apparatus, calculate summed-up values of the predicted power consumption amounts for respective times based on the first data and the second data, and compare the summed-up values with instantaneous power amount limits for the respective times, and based on the summed-up values being smaller than the instantaneous power amount limits during the respective times in entirety, perform the plurality of tasks, and based on identifying a time a summed-up value is greater than or equal to the instantaneous power amount limit, transmit a control signal controlling an operation in the identified time to the external apparatus based on priorities through the communication interface.

A method of controlling a master electronic apparatus according to an embodiment of the disclosure includes receiving first data regarding predicted power consumption amounts for respective tasks of a first electronic apparatus and second data regarding predicted power consumption amounts for respective tasks of a second electronic apparatus which are expected to be newly performed, calculating summed-up values of the predicted power consumption amounts for respective times based on the first data and the second data, and comparing the summed-up values with instantaneous power amount limits for the respective times, and based on the summed-up values being smaller than the instantaneous power amount limits during the respective times in entirety, transmitting a task approval signal to the second electronic apparatus, and based on identifying a time asummed-up value is greater than or equal to the instantaneous power amount limit, transmitting a control signal controlling an operation in the identified time to at least one of the first electronic apparatus and the second electronic apparatus based on priorities.

A method of controlling an electronic apparatus according to an embodiment of the disclosure includes receiving first data regarding predicted power consumption amounts for respective tasks from the external apparatus, identifying second data regarding predicted power consumption amounts for a plurality of respective tasks that can be performed in the electronic apparatus, calculating summed-up values of the predicted power consumption amounts for respective times based on the first data and the second data, and comparing the summed-up values with instantaneous power amount limits for the respective times, and based on the summed-up values being smaller than the instantaneous power amount limits during the respective times in entirety, performing the plurality of tasks, and based on identifying a time a summed-up value is greater than or equal to the instantaneous power amount limit, transmitting a control signal controlling an operation in the identified time to the external apparatus based on priorities.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10A, 10B and FIG. 10C are diagrams illustrating a standard for setting priorities according to an embodiment of the disclosure;

DESCRIPTION OF THE PREFERRED EMBODIMENT

Figure 1:
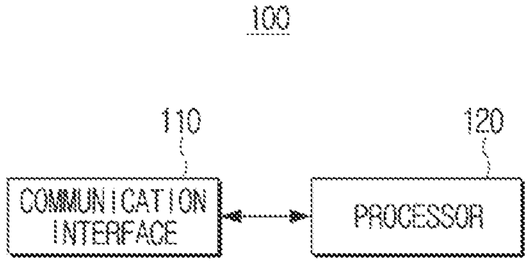
FIG. 1 is a block diagram illustrating a configuration of a master electronic apparatus according to an embodiment of the disclosure.

Hereinafter, various embodiments will be described in more detail with reference to the accompanying drawings. The embodiments described in this specification may be modified in various ways. Also, specific embodiments may be illustrated in the drawings, and described in detail in the detailed description. However, specific embodiments disclosed in the accompanying drawings are just for making the various embodiments easily understood. Accordingly, the technical idea of the disclosure is not restricted by the specific embodiments disclosed in the accompanying drawings, and the embodiments should be understood as including all equivalents or alternatives included in the idea and the technical scope of the disclosure.

Also, terms including ordinal numbers such as "first," "second" and the like may be used to describe various elements, but the aforementioned terms are not intended to limit the elements. The aforementioned terms are used only to distinguish one element from another element.

In addition, in this specification, terms such as "include" and "have" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof. Also, the description in the disclosure that one element is "coupled" or "connected" to another element should be interpreted to include both the case where the one element is directly coupled to the another element, and the case where the one element is coupled to the another element through still another element. In contrast, the description that one element is "directly coupled" or "directly connected" to another element can be interpreted to mean that still another element does not exist between the one element and the another element.

Meanwhile, "a module" or "a part" for the elements used in this specification performs at least one function or operation. Also, "a module" or "a part" may perform a function or an operation by hardware, software, or a combination of hardware and software. In addition, a plurality of "modules" or a plurality of "parts" except "a module" or "a part" that needs to be implemented in specific hardware or is performed in at least one processor may be integrated into at least one module. Further, singular expressions include plural expressions, unless defined obviously differently in the context.

Also, in the description of the disclosure, the order of each step (operation) should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

In addition, in this specification, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

Further, in describing the disclosure, in case it is determined that detailed explanation of related known functions or features may unnecessarily confuse the gist of the disclosure, the detailed explanation will be abridged or omitted. Meanwhile, each embodiment of the disclosure may be independently implemented or operated, but it may also be implemented or operated in combination with another embodiment.

The disclosure addresses the aforementioned and other existing problems, and the purpose of the disclosure is in managing a consumed power amount effectively by managing a consumed power amount based on a consumed power amount of an electronic apparatus according to an operation and time.

FIG. 1 is a block diagram illustrating a configuration of a master electronic apparatus according to an embodiment of the disclosure.

Referring to FIG. 1, a master electronic apparatus 100 may include a communication interface 110 and a processor 120. The master electronic apparatus 100 may be various apparatuses according to the configuration of the system. For example, an individual electronic apparatus (e.g., a home appliance of a home) may be communicatively connected with an external apparatus located outside the home network directly. Alternatively, an individual electronic apparatus may be communicatively connected with an external apparatus located outside the home network through an AP, etc. As an example, an individual electronic apparatus may include a washing machine, a drying machine, a TV, an air dresser, a microwave oven, a refrigerator, an induction, an air conditioner, a dehumidifier, a cleaner, a dishwasher, etc. Also, an external apparatus may include a server, a cloud, etc. In the aforementioned embodiment, a server, a cloud, etc. may be the master electronic apparatus 100.

Alternatively, an individual electronic apparatus may be communicatively connected with a control apparatus located inside the home network. As an example, a control apparatus may be an edge server connected to the home network, and one electronic apparatus (e.g., a refrigerator) among a plurality of electronic apparatuses. In the aforementioned example, an edge server, one electronic apparatus, etc. may be the master electronic apparatus 100.

The communication interface 110 may perform communication with an external apparatus. For example, the communication interface 110 may perform communication with an external apparatus by at least one communication method among communication methods such as Wi-Fi, Wi-Fi Direct, Bluetooth, Zigbee, 3rd Generation (3G), 3rd Generation Partnership Project (3GPP), and Long Term Evolution (LTE). The aforementioned communication interface 110 may also be referred to as a communicator, a communication module, a transceiver, etc., and it may be included in an input/output interface in a broad sense.

The communication interface 110 may receive data regarding predicted consumed power amounts from an individual electronic apparatus. As an example, an individual electronic apparatus may perform a plurality of tasks. The plurality of tasks may be individual tasks, and they may be tasks proceeded in a series. For example, a washing machine may perform washing, spin-drying, and drying tasks. The washing, spin-drying, and drying are individual tasks, respectively, and the washing machine may proceed with the washing, spin-drying, and drying tasks in a series.

The individual electronic apparatus may transmit data (first data) regarding the predicted consumed power amounts for the respective tasks that may be consumed when performing the plurality of respective tasks to the master electronic apparatus 100. The communication interface 110 of the master electronic apparatus 100 may receive the data regarding the predicted consumed power amounts for the respective tasks from the individual electronic apparatus.

When the individual electronic apparatus performs a task, a new electronic apparatus may start performing a task. For example, when the washing machine is performing a washing task, a microwave oven may start a cooking task.

The electronic apparatus that is expected to newly perform a task may also transmit data (second data) regarding the predicted consumed power amounts for the respective tasks that may be consumed when performing the tasks to the master electronic apparatus 100. The communication interface 110 of the master electronic apparatus 100 may receive the data regarding the predicted consumed power amounts for the respective tasks from the electronic apparatus that is expected to newly perform a task.

The processor 120 may control each component of the master electronic apparatus 100. For example, the processor 120 may control the communication interface 110 to receive data regarding predicted consumed power amounts from an external apparatus.

Then, the processor 120 may calculate summed-up values of the predicted consumed power amounts for respective times based on the first data and the second data, and compare the summed-up values with instantaneous power amount limits for the respective times. The summed-up values of the first data and the second data may be predicted values of consumed power amounts that are consumed in all electronic apparatuses operating according to time. The power amount limit may mean a maximum power amount allowed, and the instantaneous power amount limits for the respective times may mean maximum instantaneous power amounts allowed in the corresponding times (or, maximum power amounts in specific times). Accordingly, in case the summed-up values of the first data and the second data are smaller than the instantaneous power amount limits for the respective times, all electronic apparatus may perform operations stably. However, in case the summed-up value of the first data and the second data is greater than or equal to the instantaneous power amount limit in a specific time, a blackout may occur in the time.

Accordingly, if the summed-up values are smaller than the instantaneous power amount limits in the entire times, the processor 120 may control the communication interface 110 to transmit a task approval signal to the electronic apparatus that is expected to newly perform a task. The electronic apparatus that is expected to newly perform a task that received the task approval signal may perform the task. In contrast, if a time wherein the summed-up value is greater than or equal to the instantaneous power amount limit is identified, the processor 120 may control the communication interface 110 to transmit a control signal for controlling an operation in the identified time to the individual electronic apparatus performing a task or the electronic apparatus that is expected to newly perform a task based on priorities.

For example, the priorities may be set based on at least one item among the use cycle of each individual electronic apparatus, the average use time, whether a user is involved, whether health is related, the degree of use of the power amount, the current time, the usability in the next time, and a user's tendency of use. Alternatively, the priorities may be set based on the user's tendency of use including at least one item among the use frequency of respective apparatuses, the use frequency according to the seasons, and the use frequency according to the times.

For example, if the priority of the task of a specific individual electronic apparatus is a lower priority in the time wherein the summed-up value is greater than or equal to the instantaneous power amount limit, the processor 120 may control the communication interface 110 to transmit a control signal for changing the type of the task to a low power task or a control signal for delaying the task to the specific individual electronic apparatus. The individual electronic apparatus that is performing the task that received the control signal may control performing of the task in the time based on the control signal. That is, the individual electronic apparatus that received the control signal may perform the task by changing the type of the task or delaying the task.

The processor 120 may adjust the summed-up value according to the change or the delay of the task of the individual electronic apparatus that was previously performing the task in the time wherein the summed-up value is greater than or equal to the instantaneous power amount limit. If the adjusted summed-up value is greater than or equal to the instantaneous power amount limit, the processor 120 may control the communication interface 110 to transmit a signal not allowing a task to the electronic apparatus that is expected to perform a task. The electronic apparatus that is expected to perform a task that received the control signal may not perform the task.

So far, the configuration of the master electronic apparatus 100 that manages power amounts in a system including individual electronic apparatuses and a separate master electronic apparatus 100 was described. For example, the system including the master electronic apparatus 100 may include individual electronic apparatuses such as a washing machine, a drying machine, a TV, an air dresser, a microwave oven, a refrigerator, an induction, an air conditioner, a dehumidifier, a cleaner, a dishwasher, etc., and the individual electronic apparatuses may transmit data regarding predicted consumed power amounts to a server. The server may perform a control operation of the power amounts of the electronic apparatuses based on the received data regarding the predicted consumed power amounts. That is, in the aforementioned system, the server may be the master electronic apparatus 100. Alternatively, the individual electronic apparatuses may transmit the data regarding the predicted consumed power amounts to a predetermined apparatus (e.g., a refrigerator). The predetermined apparatus may perform a control operation of the power amounts of the electronic apparatuses based on the received data regarding the predicted consumed power amounts. That is, in the aforementioned system, the predetermined apparatus may be the master electronic apparatus 100.

Meanwhile, the plurality of electronic apparatuses may be communicatively connected in an equal relationship among the respective apparatuses without the master electronic apparatus 100. In this case, an electronic apparatus that is expected to perform a task among the plurality of electronic apparatuses may perform a control operation of power amounts. For example, when a refrigerator and a TV are performing tasks, a microwave oven may be about to newly perform a task. Here, the microwave oven may perform a control operation of power amounts. Alternatively, when a refrigerator, an air conditioner, and a dishwasher are performing tasks, a TV may be about to newly perform a task. Here, the TV may perform a control operation of power amounts.

An electronic apparatus that is expected to newly perform a task may also include the same components as the components of the master electronic apparatus 100 described in FIG. 1, and perform a similar operation to the operation of the master electronic apparatus 100. That is, the components of the master electronic apparatus 100 described in FIG. 1 may be the same as the components of an electronic apparatus that performs an operation of managing power amounts among the plurality of electronic apparatuses communicatively connected in an equal relation.

That is, an electronic apparatus performing an operation of managing power amounts among the plurality of electronic apparatuses may include a communication interface 110 and a processor 120.

The communication interface 110 may perform communication with external apparatuses performing a plurality of tasks. For example, the external apparatuses performing a plurality of tasks may include a washing machine, a drying machine, a TV, an air dresser, a microwave oven, a refrigerator, an induction, an air conditioner, a dehumidifier, a cleaner, a dishwasher, etc. The communication interface 110 may receive data regarding predicted consumed power amounts for respective tasks (first data) from the external apparatuses. As an example, the external apparatuses may broadcast the data regarding predicted consumed power amounts for respective tasks, and the communication interface 110 may receive the broadcasted predicted consumed power amounts for respective tasks.

The processor 120 may identify data regarding predicted consumed power amounts for a plurality of respective tasks that can be performed (second data). Then, the processor 120 may calculate summed-up values of the predicted consumed power amounts for respective times based on the first data and the second data, and compare the summed-up values with instantaneous power amount limits for the respective times.

If the summed-up values are smaller than the instantaneous power amount limits in the entire times, the processor 120 may perform the expected tasks. However, if a time wherein the summed-up value is greater than or equal to the instantaneous power amount limit is identified, the processor 120 may control the communication interface 110 to transmit a control signal for controlling an operation in the identified time to an external apparatus based on priorities. For example, if the priority of a task of an external apparatus is a lower priority in the time wherein the summed-up value is greater than or equal to the instantaneous power amount limit, the processor 120 may control the communication interface 110 to transmit a first control signal for changing, with respect to the external apparatus, the type of the task to a low power task or a second control signal for delaying the task. For example, the first control signal may include an instruction for changing a task to a low power task and information on a corresponding external apparatus, and the second control signal may include an instruction for delaying a task and information on a corresponding external apparatus. The processor 120 may broadcast the first control signal or the second control signal. The plurality of external electronic apparatuses may receive the broadcasted first control signal or second control signal. If an external apparatus is an apparatus corresponding to the information on an external apparatus included in the first control signal or the second control signal, the external apparatus may change the task or delay the task according to the first control signal or the second control signal. However, if an external apparatus is not an apparatus corresponding to the information on an external apparatus included in the first control signal or the second control signal, the external apparatus may ignore the received control signal.

Alternatively, the processor 120 may adjust the summed-up value according to change or delay of the task of the external apparatus in the time wherein the summed-up value is greater than or equal to the instantaneous power amount limit, and determine whether the adjusted summed-up value is greater than or equal to the instantaneous power amount limit. If the adjusted summed-up value is greater than or equal to the instantaneous power amount limit, the processor 120 may prohibit performing of the task.

Figure 2:
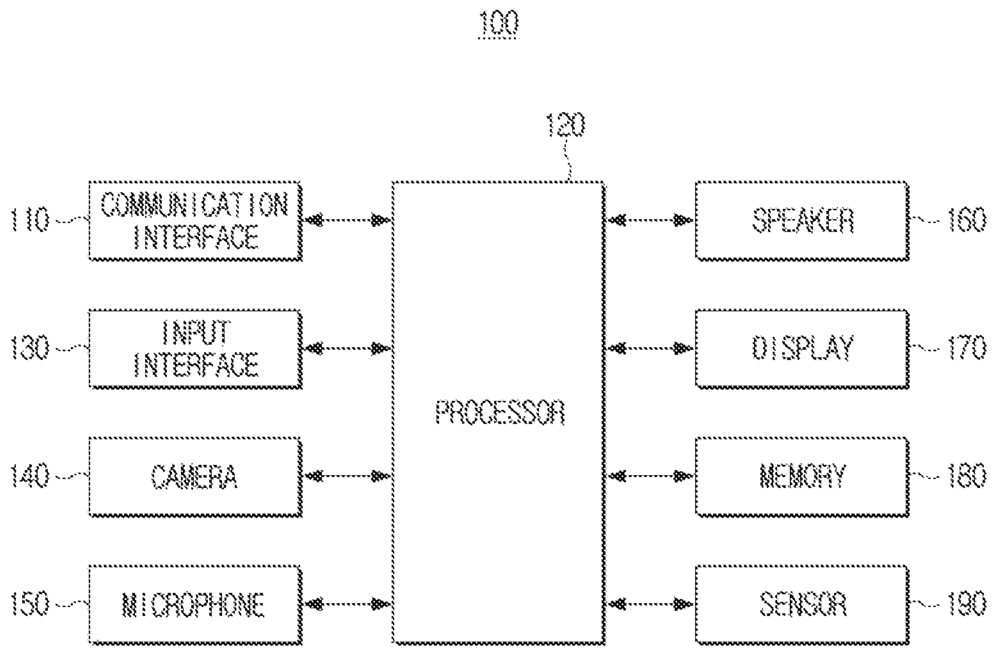
FIG. 2 is a block diagram illustrating a detailed configuration of a master electronic apparatus according to an embodiment of the disclosure.

FIG. 2 is a block diagram illustrating a detailed configuration of a master electronic apparatus according to an embodiment of the disclosure.

Referring to FIG. 2, the master electronic apparatus 100 may include a communication interface 110, a processor 120, an input interface 130, a camera 140, a microphone 150, a speaker 160, a display 170, a memory 180, and a sensor 190. As the communication interface 110 is the same as described in FIG. 1, detailed explanation will be omitted.

The input interface 130 may receive an input of an instruction from a user. Alternatively, the input interface 130 may include an input/output port, and receive or output data. For example, in case the input interface 130 includes an input/output port, the input/output port may include ports such as a high-definition multimedia interface (HDMI), a display port (DP), an RGB, a digital visual interface (DVI), a universal serial bus (USB), a Thunderbolt, a LAN, an AUX, etc. The input interface 130 may also be referred to as an input part, an input module, etc. In case the input interface 130 performs an input/output function, it may be referred to as an input/output part, an input/output module, etc.

The camera 140 may photograph the surrounding environment of the master electronic apparatus 100. Alternatively, the camera 140 may photograph a user's expression or action, etc. The processor 120 may acquire information on the surrounding environment from the photographed image, and recognize a control instruction based on the photographed expression or action of the user, and perform a control operation corresponding to the received control instruction. For example, the camera 140 may include a CCD sensor and a CMOS sensor. Also, the camera 140 may include an RGB camera and a depth camera.

The microphone 150 may receive an input of a user's voice. The processor 120 may recognize a control instruction based on the input voice, and perform a control operation corresponding to the recognized control instruction.

The speaker 160 outputs a voice signal for which voice processing was performed. The speaker 160 may output information on a user's input instruction, information related to the state of the master electronic apparatus 100, or information related to an operation as a voice or a notification sound.

The display 170 may output data processed at the processor 120 as an image. For example, the display 170 may be implemented as a liquid crystal display (LCD), organic light emitting diodes (OLED), a flexible display, a touch screen, etc. In case the display 170 is implemented as a touch screen, the master electronic apparatus 100 may receive an input of a control instruction through the touch screen.

The memory 180 may store data, an algorithm, etc. performing the functions of the master electronic apparatus 100, and also store programs, instructions, etc. operated at the master electronic apparatus 100. The algorithm stored in the memory 180 may be loaded on the processor 120 by control of the processor 120 and compare the summed-up predicted consumed power amount and the instantaneous power amount limits, and identify a subject apparatus for changing a task or delaying a task based on priorities. For example, the memory 180 may be implemented in types such as a ROM, a RAM, an HDD, an SSD, a memory card, etc.

The sensor 190 may detect an object around the master electronic apparatus 100. The processor 120 may recognize a control instruction based on a detected signal, and perform a control operation corresponding to the recognized control instruction. Also, the sensor 190 may detect information on the surrounding environment of the master electronic apparatus 100. The processor 120 may perform a corresponding control operation based on the information on the surrounding environment detected at the sensor 190. For example, the sensor 190 may include an acceleration sensor, a gravity sensor, a gyro sensor, a geomagnetic sensor, a direction sensor, a motion recognition sensor, a proximity sensor, a voltmeter, an ammeter, a barometer, a hygrometer, a thermometer, an illumination sensor, a heat detection sensor, a touch sensor, an infrared sensor, an ultrasonic sensor, etc.

Meanwhile, the plurality of electronic apparatuses may be communicatively connected in an equal relationship among the respective apparatuses without the master electronic apparatus 100. In this case, an electronic apparatus that is expected to perform a task among the plurality of electronic apparatuses may perform a control operation of power amounts. An electronic apparatus that is expected to newly perform a task may also include the same components as the components of the master electronic apparatus 100 described in FIG. 2, and perform a similar operation to the operation of the master electronic apparatus 100. That is, the components of the master electronic apparatus 100 described in FIG. 2 may be the same as the components of an electronic apparatus that performs an operation of managing power amounts among the plurality of electronic apparatuses communicatively connected in an equal relation.

Meanwhile, the master electronic apparatus 100 and the electronic apparatus that performs an operation of managing power amounts may include all of the aforementioned components, or they may include some components. Also, the master electronic apparatus 100 and the electronic apparatus that performs an operation of managing power amounts may further include other components performing various functions other than the aforementioned components. So far, the configuration of the master electronic apparatus 100 was described. Hereinafter, an embodiment of managing power amounts will be described.

Figure 3:
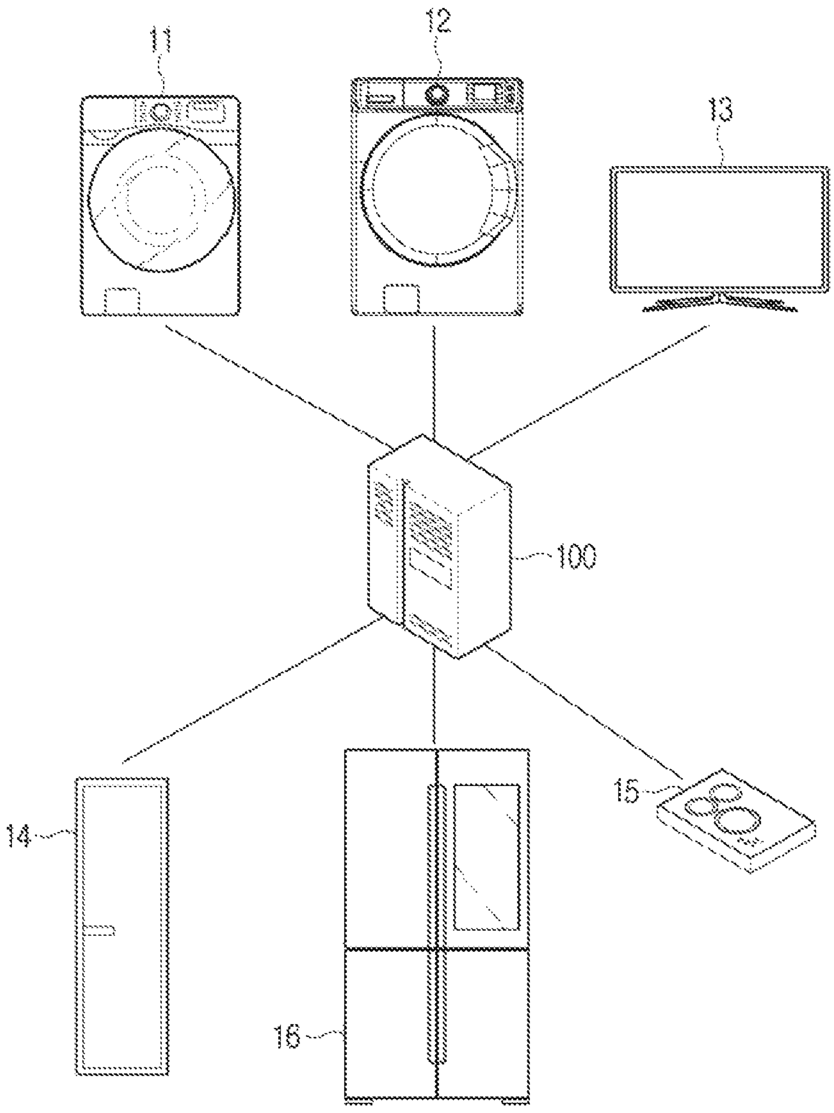
FIG. 3 is a diagram illustrating a system including a master electronic apparatus according to a first embodiment of the disclosure.
Figure 4:
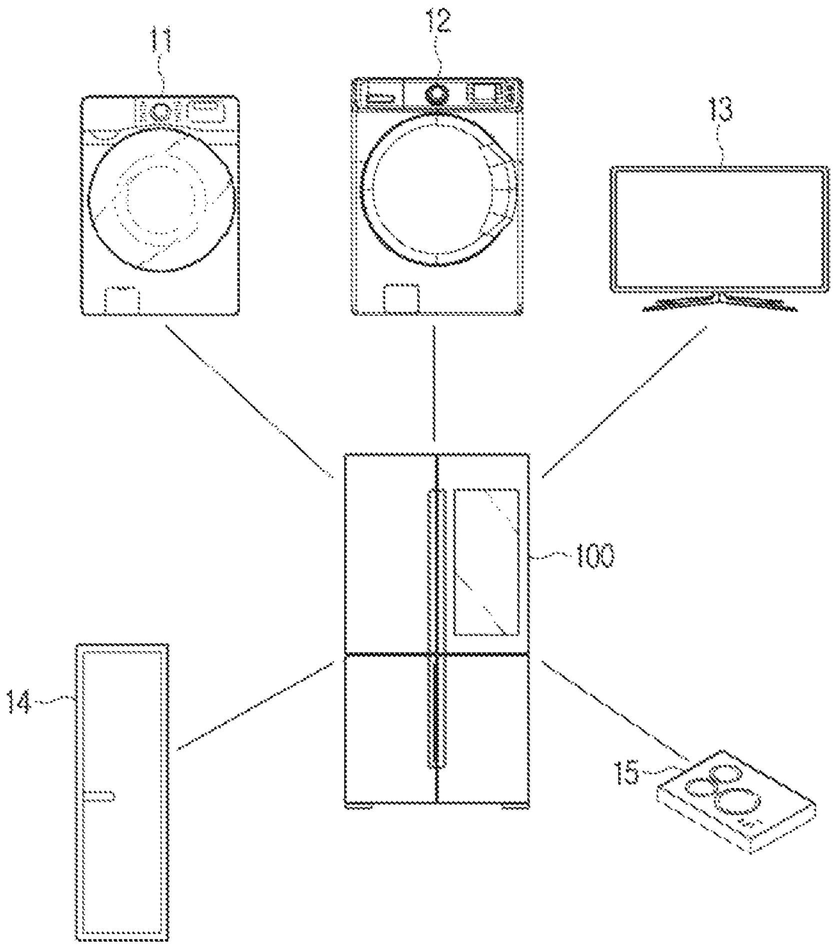
FIG. 4 is a diagram illustrating a system including a master electronic apparatus according to a second embodiment of the disclosure.

FIG. 3 is a diagram illustrating a system including a master electronic apparatus according to a first embodiment of the disclosure, and FIG. 4 is a diagram illustrating a system including a master electronic apparatus according to a second embodiment of the disclosure. Explanation will be made with reference to FIG. 3 and FIG. 4 together.

Referring to FIG. 3, a plurality of electronic apparatuses 11-16 and the master electronic apparatus 100 are illustrated. For example, the plurality of electronic apparatuses 11-16 may be home appliances used in a home. The plurality of electronic apparatuses 11-16 may be a washing machine 11, a drying machine 12, a TV 13, an air dresser 14, a microwave oven 15, and a refrigerator 16, but they are not limited to the aforementioned description. The plurality of respective electronic apparatuses 11-16 may be communicatively connected with other electronic apparatuses within a network in a specific range, and may be communicatively connected with the master electronic apparatus 100 located outside the network in a specific range. The plurality of respective electronic apparatuses 11-16 may be communicatively connected with the master electronic apparatus 100 directly, and they may also be connected through an access point (AP), etc. In the embodiment in FIG. 3, the master electronic apparatus 100 may include a server, a cloud, etc.

The plurality of respective electronic apparatuses 11-16 may transmit predicted consumed power amounts when performing tasks to the master electronic apparatus 100. The plurality of electronic apparatuses 11-16 may perform a plurality of tasks, and the plurality of tasks may be continuous tasks related to one another. The plurality of electronic apparatuses 11-16 may transmit the predicted consumed power amounts for the respective tasks to the master electronic apparatus 100.

The master electronic apparatus 100 may store information regarding the power amount limits (or, the maximum allowed power amounts) in the areas wherein the plurality of electronic apparatuses 11-16 are located. In case the received predicted consumed power amounts are smaller than the power amount limits, the master electronic apparatus 100 may transmit task approval signals to the electronic apparatuses 11-16. The electronic apparatuses 11-16 that received the task approval signals may perform tasks.

Meanwhile, while some electronic apparatuses among the plurality of electronic apparatuses 11-16 are performing tasks, anew electronic apparatus may newly start performing a task. The electronic apparatus which is expected to newly perform a task may transmit a predicted consumed power amount regarding the task that is expected to be performed to the master electronic apparatus 100.

The master electronic apparatus 100 may control the operation of an electronic apparatus which was previously performing a task or the electronic apparatus which is expected to newly perform a task based on the previously predicted consumed power amount (the first data) and the predicted consumed power amount received from the electronic apparatus which is expected to newly perform a task (the second data). For example, the master electronic apparatus 100 may sum up the first data and the second data, and compare the summed-up value with the instantaneous power amount limit. The master electronic apparatus 100 may compare the summed-up values for the respective times with the instantaneous power amount limits based on the times when the respective tasks are performed. If the summed-up values are smaller than the instantaneous power amount limits in the entire times, the master electronic apparatus 100 may transmit a task approval signal to the electronic apparatus which is expected to newly perform a task. The electronic apparatus which is expected to newly perform a task that received the task approval signal may perform the task. In contrast, if a time wherein the summed-up value is greater than or equal to the instantaneous power amount limit is identified, the master electronic apparatus 100 may transmit a control signal for controlling an operation in the identified time to the electronic apparatus which was previously performing a task or the electronic apparatus which is expected to newly perform a task based on priorities. For example, the master electronic apparatus 100 may transmit a control signal for changing the type of the task to a low power task or a control signal for delaying the task to the electronic apparatus which was previously performing a task.

Also, the master electronic apparatus 100 may adjust the summed-up value according to change or delay of the task of the electronic apparatus which was previously performing a task in the time wherein the summed-up value is greater than or equal to the instantaneous power amount limit. If the adjusted summed-up value is greater than or equal to the instantaneous power amount limit, the master electronic apparatus 100 may transmit a signal not allowing a task to the electronic apparatus which is expected to newly perform a task. Through the aforementioned process, the master electronic apparatus 100 may manage the power amounts of the plurality of electronic apparatuses 11-16 so that problems such as a blackout due to shortage of the power amount, etc. do not occur.

Referring to FIG. 4, a plurality of electronic apparatuses 11-15, 100 are illustrated. The plurality of respective electronic apparatuses 11-15, 100 may be communicatively connected with other electronic apparatuses within a network in a specific range. In the example in FIG. 4, the master electronic apparatus 100 may be a predetermined electronic apparatus among the plurality of electronic apparatuses 11-15, 100. For example, the plurality of electronic apparatuses 11-15, 100 may be a washing machine 11, a drying machine 12, a TV 13, an air dresser 14, a microwave oven 15, and a refrigerator, and the predetermined electronic apparatus may be the refrigerator (that is, the refrigerator may be the master electronic apparatus 100). In the example in FIG. 4, a case wherein the master electronic apparatus 100 is one of the plurality of electronic apparatuses 11-15, 100 is described, but the master electronic apparatus 100 may be a separate apparatus like an edge server within the same network. Meanwhile, in the example in FIG. 4, the master electronic apparatus 100 is different from the example in FIG. 3 only in that it is an apparatus within the same network, and the operation of managing the power amounts is the same as described in FIG. 3, and thus overlapping explanation will be omitted.

Figure 5:
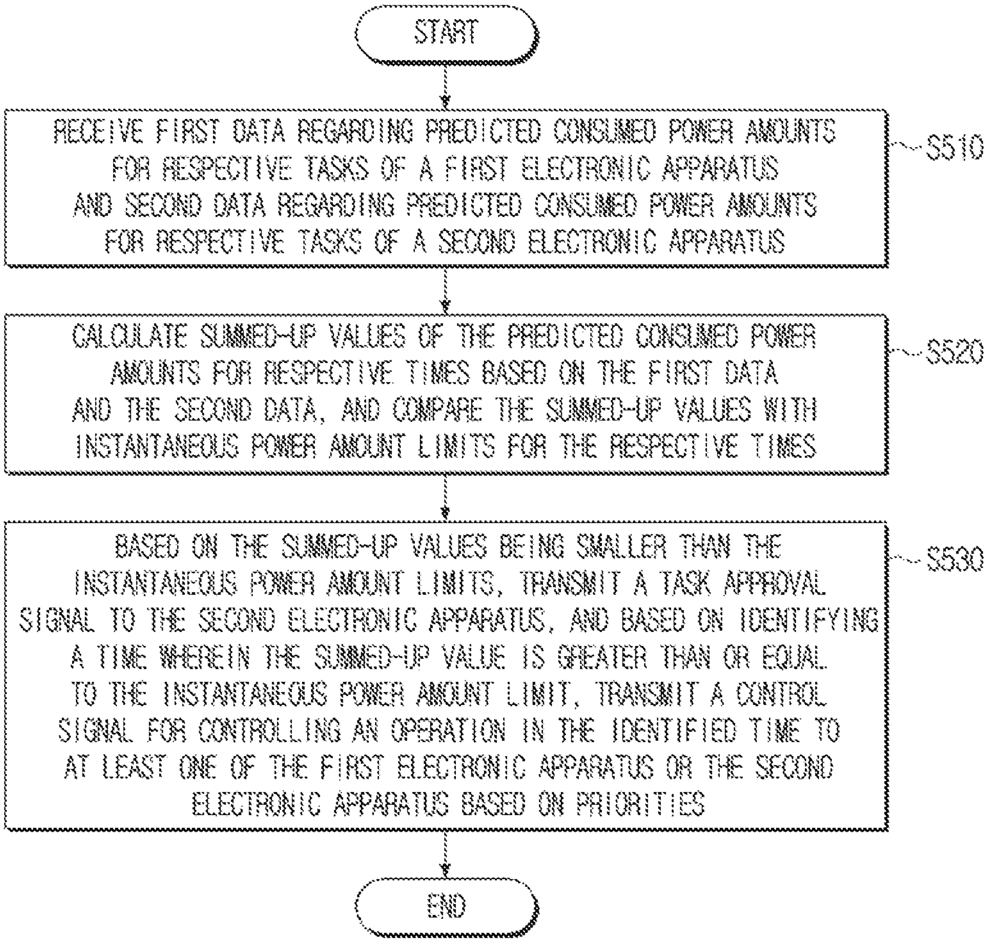
FIG. 5 is a flow chart illustrating a method of controlling a master electronic apparatus according to an embodiment of the disclosure.

FIG. 5 is a flow chart illustrating a method of controlling a master electronic apparatus according to an embodiment of the disclosure.

Referring to FIG. 5, the master electronic apparatus may receive first data regarding predicted consumed power amounts for respective tasks of a first electronic apparatus and second data regarding predicted consumed power amounts for respective tasks of a second electronic apparatus in operation S510. For example, the first electronic apparatus may mean an electronic apparatus performing a plurality of tasks. Meanwhile, the second electronic apparatus may mean an electronic apparatus which is expected to newly perform a task.

The master electronic apparatus may calculate summed-up values of the predicted consumed power amounts for respective times based on the first data and the second data, and compare the summed-up values with instantaneous power amount limits for the respective times in operation S520. For example, the first and second electronic apparatuses may perform different tasks according to the times, and the predicted consumed power amounts may vary according to the tasks. The master electronic apparatus may compare the predicted consumed power amounts of the entire electronic apparatuses for the respective times according to the times and the tasks with the instantaneous power amount limits for the respective times.

If the summed-up values are smaller than the instantaneous power amount limits, the master electronic apparatus may transmit a task approval signal to the second electronic apparatus. Meanwhile, if a time wherein the summed-up value is greater than or equal to the instantaneous power amount limit is identified, the master electronic apparatus may transmit a control signal for controlling an operation in the identified time to at least one of the first electronic apparatus or the second electronic apparatus based on priorities in operation S530. For example, if the priority of the task of the first electronic apparatus is a lower priority in the time wherein the summed-up value is greater than or equal to the instantaneous power amount limit, the master electronic apparatus may transmit a first control signal for changing, with respect to the first electronic apparatus, the type of the task to a low power task or a second control signal for delaying the task. Also, the master electronic apparatus may adjust the summed-up value according to change or delay of the task of the first electronic apparatus in the time wherein the summed-up value is greater than or equal to the instantaneous power amount limit. Then, if the adjusted summed-up value is greater than or equal to the instantaneous power amount limit, the master electronic apparatus may transmit a signal not allowing a task for the second electronic apparatus.

As an example, the priorities may be set based on at least one item among the use cycle of each individual electronic apparatus, the average use time, whether a user is involved, whether health is related, the degree of use of the power amount, the current time, the usability in the next time, and a user's tendency of use. Also, the priorities may be set based on the user's tendency of use including at least one item among the use frequency of respective apparatuses, the use frequency according to the seasons, and the use frequency according to the times.

So far, an example of a system managing power amounts including a master electronic apparatus was described. However, a system managing power amounts may be implemented without a master electronic apparatus.

Figure 6:
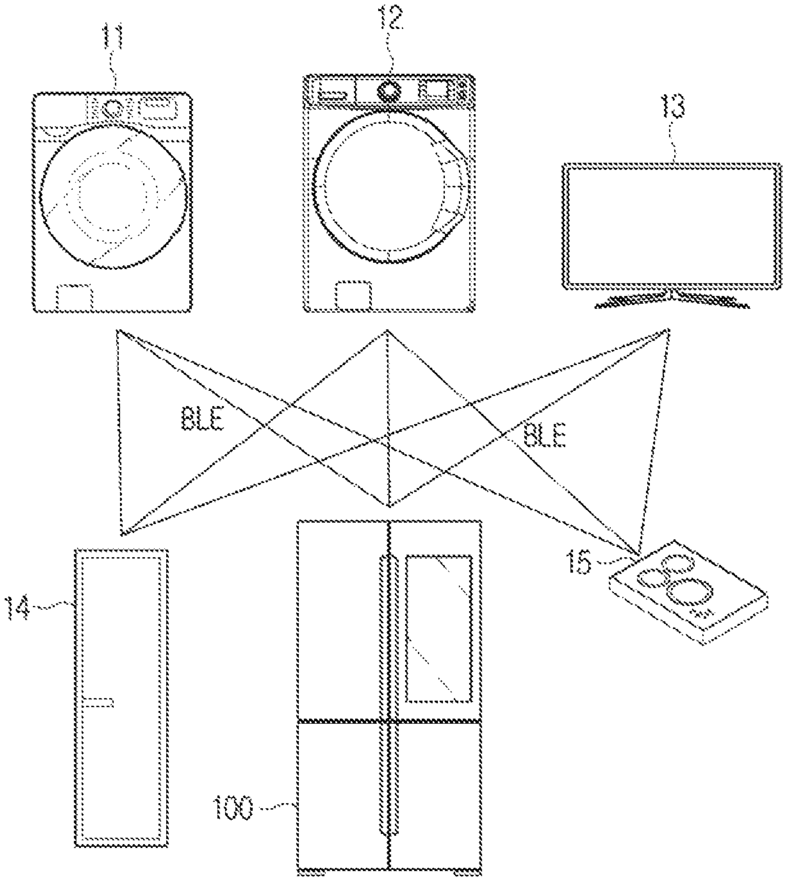
FIG. 6 is a diagram illustrating a system including an electronic apparatus according to a third embodiment of the disclosure.

FIG. 6 is a diagram illustrating a system including an electronic apparatus according to a third embodiment of the disclosure.

Referring to FIG. 6, a plurality of electronic apparatuses 11-15, 100 are illustrated. For example, the plurality of respective electronic apparatuses 11-15, 100 may be communicatively connected with other electronic apparatuses individually within a network in a specific range. Alternatively, the plurality of respective electronic apparatuses 11-15, 100 may be connected with other electronic apparatuses through an access point (AP), etc.

Some electronic apparatuses 11-15 among the plurality of electronic apparatuses 11-15, 100 may perform tasks. Some electronic apparatuses 11-15 performing tasks may transmit predicted consumed power amounts to other electronic apparatuses when they are performing tasks. As an example, some electronic apparatuses 11-15 may transmit the predicted consumed power amounts by a broadcasting method. Also, some electronic apparatuses 11-15 may perform a plurality of tasks, and the plurality of tasks may be continuous tasks related to one another. Some electronic apparatuses 11-15 may transmit the predicted consumed power amounts for respective tasks to other electronic apparatuses. The plurality of respective electronic apparatuses 11-15, 100 may store information on the power amount limits (or, the maximum allowed power amounts).

Meanwhile, while some electronic apparatuses 11-15 are performing tasks, a new electronic apparatus 100 may start a task. The new electronic apparatus 100 may identify a predicted consumed power amount for the task that is expected to be performed. The new electronic apparatus 100 may perform a plurality of tasks, and identify predicted consumed power amounts for the respective tasks. Then, the new electronic apparatus 100 may transmit the predicted consumed power amounts for the respective tasks (the second data) to other electronic apparatuses. Further, the new electronic apparatus 100 may also receive the predicted consumed power amounts for the respective tasks (the first data) from some electronic apparatuses 11-15. The new electronic apparatus 100 may calculate summed-up values of the predicted consumed power amounts for the respective times based on the first data and the second data. Then, the new electronic apparatus 100 may compare the summed-up values with the instantaneous power amount limits for the respective times.

If the calculated summed-up values are smaller than the instantaneous power amount limits, the new electronic apparatus 100 may perform the expected tasks. Alternatively, if the calculated summed-up values are greater than or equal to the instantaneous power amount limits, the new electronic apparatus 100 may control the operations of some electronic apparatuses 11-15 that were previously performing tasks. For example, the new electronic apparatus 100 may transmit control signals for controlling the operations in the identified times to some electronic apparatuses 11-15 that were previously performing tasks based on priorities. For example, the new electronic apparatus 100 may transmit control signals for changing the types of the tasks to low power tasks or control signals for delaying the tasks to some electronic apparatuses 11-15 that were previously performing tasks. The new electronic apparatus 100 may transmit the control signals to some electronic apparatuses 11-15 that were previously performing tasks by a broadcasting method. Some electronic apparatuses 11-15 that were previously performing tasks may identify the electronic apparatuses which are subjects for control included in the received control signals. The electronic apparatuses that coincide with the identified electronic apparatuses which are subjects for control may change the tasks or delay the tasks based on the received control signals. The electronic apparatuses that do not coincide with the identified electronic apparatuses which are subjects for control may ignore the received control signals, and continuously perform the tasks that they are performing.

Through the aforementioned process, the power amount management system can manage the power amounts of the plurality of electronic apparatuses 11-15, 100 so that problems such as a blackout due to shortage of the power amount, etc. do not occur.

Figure 7:
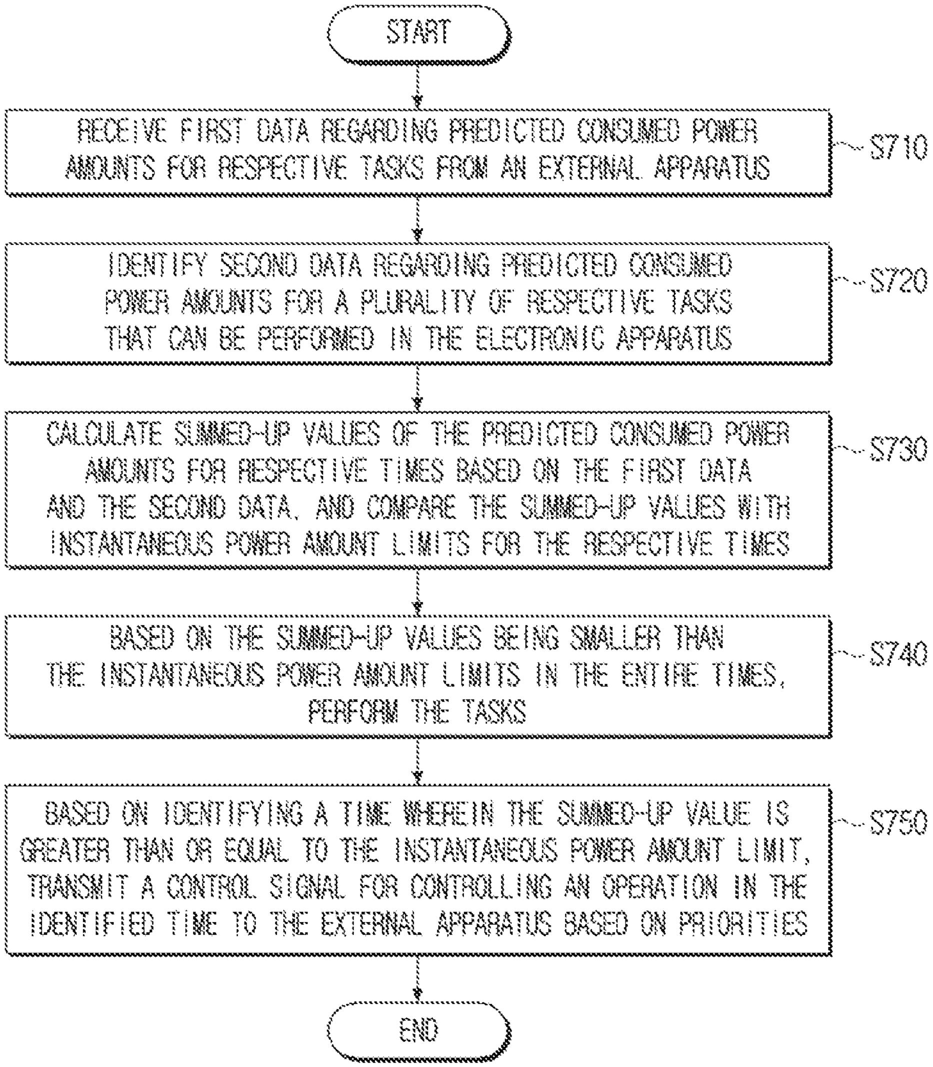
FIG. 7 is a flow chart illustrating a method of controlling an electronic apparatus according to an embodiment of the disclosure.

FIG. 7 is a flow chart illustrating a method of controlling an electronic apparatus according to an embodiment of the disclosure.

Referring to FIG. 7, the electronic apparatus may receive the first data regarding the predicted consumed power amounts for the respective tasks from an external apparatus in operation S710. For example, the external apparatus may transmit the predicted consumed power amounts for the respective tasks by a broadcasting method. The electronic apparatus may identify the second data regarding the predicted consumed power amounts for a plurality of respective tasks that can be performed in the electronic apparatus in operation S720. The electronic apparatus and the external apparatus may be apparatuses connected through the same network. The external apparatus may be an apparatus which was previously performing a task, and the electronic apparatus may be an apparatus which is expected to newly perform a task. The electronic apparatus and the external apparatus may be apparatuses connected in an equal relation.

The electronic apparatus may calculate summed-up values of the predicted consumed power amounts for the respective times based on the first data and the second data, and compare the summed-up values with the instantaneous power amount limits for the respective times in operation S730. Then, if the summed-up values are smaller than the instantaneous power amount limits in the entire times, the electronic apparatus may perform the tasks in operation S740.

In contrast, if a time wherein the summed-up value is greater than or equal to the instantaneous power amount limit is identified, the electronic apparatus may transmit a control signal for controlling an operation in the identified time to an external apparatus based on priorities in operation S750. For example, if the priority of the task of the external apparatus is a lower priority in the time wherein the summed-up value is greater than or equal to the instantaneous power amount limit, the electronic apparatus may transmit a first control signal for changing, with respect to the external apparatus, the type of the task to a low power task or a second control signal for delaying the task. Also, the electronic apparatus may adjust the summed-up value according to change or delay of the task of the external apparatus at the time wherein the summed-up value is greater than or equal to the instantaneous power amount limit, and if the adjusted summed-up value is greater than or equal to the instantaneous power amount limit, the external apparatus may not perform the task.

Meanwhile, the priorities may be set based on at least one item among the use cycle of each apparatus, the average use time, whether a user is involved, whether health is related, the degree of use of the power amount, the current time, the usability in the next time, and a user's tendency of use. Also, the priorities may be set based on the user's tendency of use including at least one item among the use frequency of each apparatus, the use frequency according to the seasons, and the use frequency according to the times.

Figure 8:
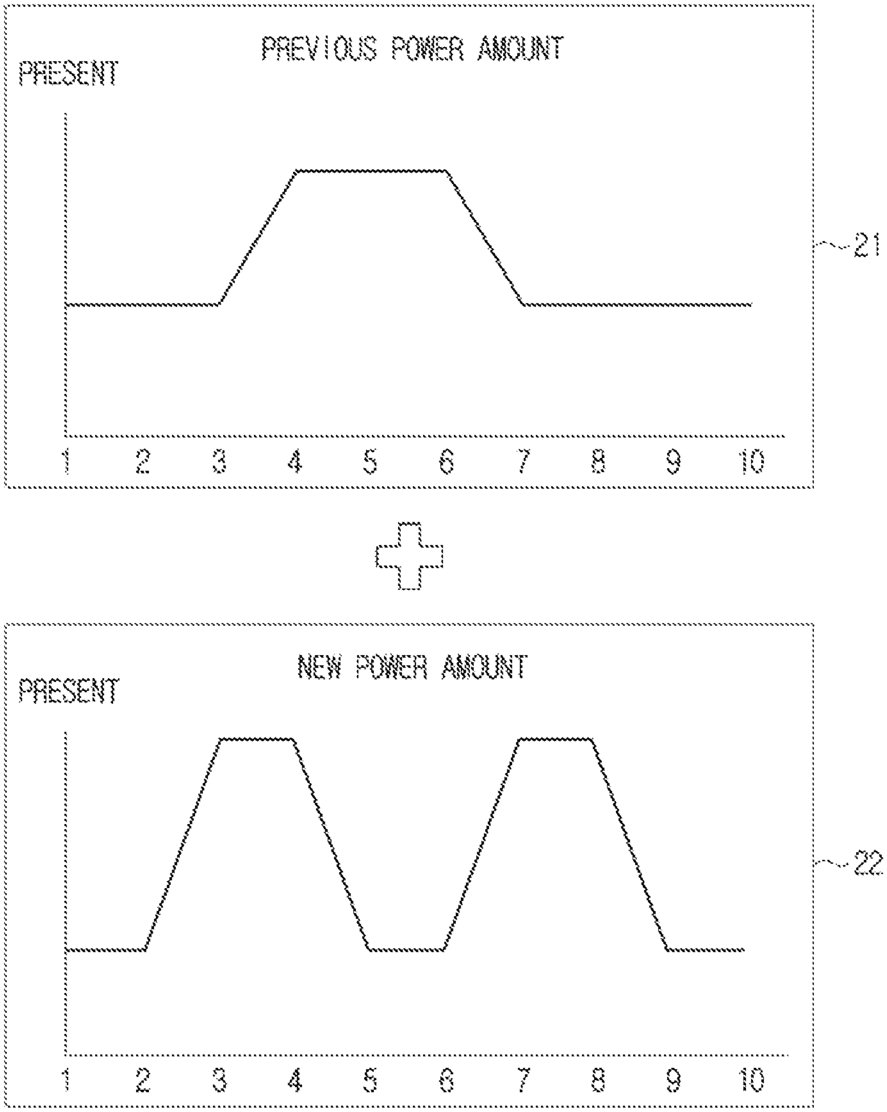
FIG. 8 is a diagram illustrating a total consumed power amount according to an embodiment of the disclosure.
Figure 9A:
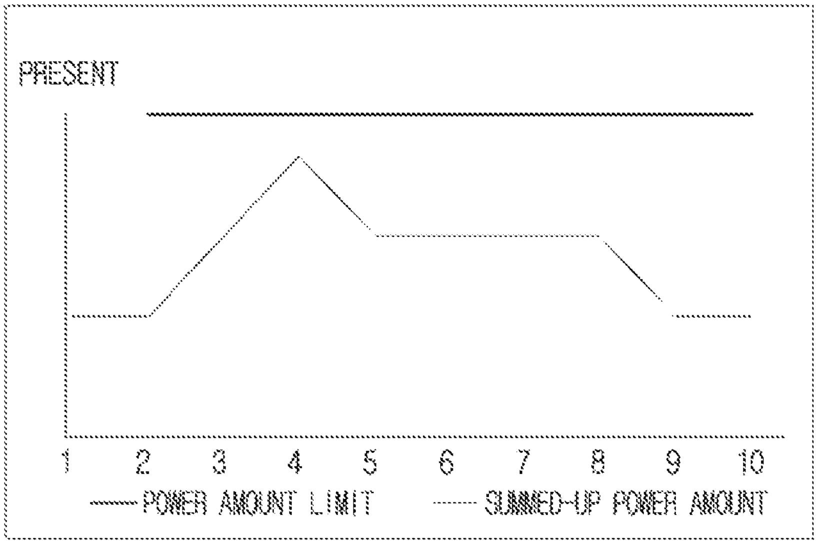
FIG. 9A and FIG. 9B are diagrams illustrating a process of determining whether a total consumed power amount according to an embodiment of the disclosure is greater than or equal to a limit power amount.
Figure 9B:
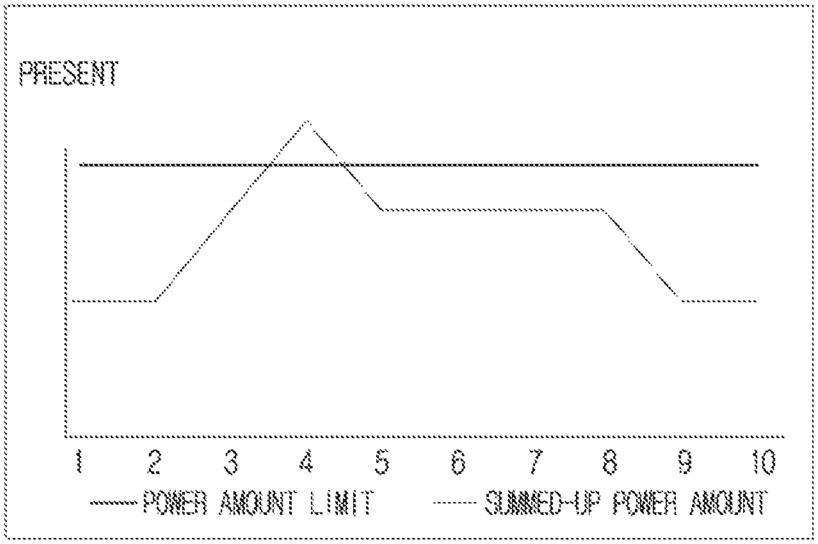

FIG. 8 is a diagram illustrating a total consumed power amount according to an embodiment of the disclosure, and FIG. 9A and FIG. 9B are diagrams illustrating a process of determining whether a total consumed power amount according to an embodiment of the disclosure is greater than or equal to a limit power amount. Hereinafter, explanation will be made with reference to FIG. 8, FIG. 9A, and FIG. 9B together.

Referring to FIG. 8, a graph 21 of the previous power amounts and a graph 22 of new power amounts are illustrated.

The graph 21 of the previous power amounts indicates the predicted consumed power amounts that at least one electronic apparatus currently performing a task predicted for the respective times, and the graph 22 of new power amounts indicates the predicted consumed power amounts that a new electronic apparatus initiating a task predicted for the respective times. The new electronic apparatus connected with the master electronic apparatus or another electronic apparatus in an equal relation may sum up the previous power amounts and the new power amounts and calculate the summed-up values, and compare the calculated summed-up values and the power amount limits, and determine whether to control individual electronic apparatuses.

As illustrated in FIG. 9A, in case the summed-up values are smaller than the power amount limits in the entire times, the master electronic apparatus may transmit a task approval signal to the new electronic apparatus. The new electronic apparatus may receive the task approval signal, and perform the expected task. Alternatively, in case the summed-up values are smaller than the power amount limits in the entire times, the new electronic apparatus connected with another electronic apparatus in an equal relation may perform the expected task.

In contrast, as illustrated in FIG. 9B, the summed-up value in a specific time may be greater than or equal to the power amount limit. If a time wherein the summed-up value is greater than or equal to the power amount limit is identified, the master electronic apparatus or the electronic apparatus may transmit a control signal to an individual electronic apparatus. For example, a control signal may include a control signal changing the type of the task to a low power task or a control signal delaying the task. The master electronic apparatus may transmit a control signal prohibiting the task of the new electronic apparatus. Alternatively, the new electronic apparatus connected with another electronic apparatus in an equal relation may not perform the task.

Meanwhile, a subject apparatus of a control signal for changing the task or a control signal for delaying the task may be identified based on priorities. Hereinafter, an embodiment of setting priorities will be described.

FIG. 10A to FIG. 10C are diagrams illustrating a standard for setting priorities according to an embodiment of the disclosure.

Referring to FIG. 10A, an example of a combination table of the respective apparatuses that can save power amounts is illustrated. Also, referring to FIG. 10B, an example of a table of tasks corresponding to the power amounts of the respective apparatuses is illustrated. Further, referring to FIG. 10C, an example of a table of priorities of the respective apparatuses set based on various items is illustrated. Hereinafter, explanation will be made with reference to FIG. 10A to FIG. 10C.

For example, the priorities may be set based on at least one item among the use cycle of each electronic apparatus, the average use time, whether a user is involved, whether health is related, the degree of use of the power amount, the current time, the usability in the next time, and a user's tendency of use. Then, the priorities may be stored in the master electronic apparatus or each electronic apparatus in the form of the table illustrated in FIG. 10A to FIG. 10C.

For example, the combination table of the respective apparatuses that can save power amounts, the table of tasks corresponding to the power amounts of the respective apparatuses, and the table of priorities of the respective apparatuses may be generated in advance, and stored in the master electronic apparatus or each electronic apparatus. In case the summed-up values of the predicted consumed power amounts are greater than or equal to the power amount limits, the master electronic apparatus or each electronic apparatus may change or delay the tasks of the electronic apparatuses based on the stored tables. The stored tables may be updated based on the user's tendency of use.

As an example, an electronic apparatus related to whether health is related may have the highest priority. Also, in the beginning, a table having the same data in an A home and a B home may be stored in the master electronic apparatus or each electronic apparatus. However, in case the use of the oven is frequent in the A home, the priority of the oven may be updated to be high. Also, in case the use of the washing machine is frequent in the B home, the priority of the washing machine may be updated to be high. Alternatively, in case a bread baking task is performed frequently among the tasks of the oven in the A home, the priority of the bread baking task among the tasks of the oven may be updated to be high, and in case a washing task is performed frequently among the tasks of the washing machine in the B home, the priority of the washing task among the tasks of the washing machine may be updated to be high.

Also, in case the use of the air conditioner is frequent between June and August in a home located in Korea, the priority of the air conditioner may be updated to be high between June and August, and in case the use of the air conditioner is frequent between December and January in a home located in Australia, the priority of the air conditioner may be updated to be high between December and January.

That is, the priorities may be changed by reflecting a user's tendency of use, and a user's tendency of use may include the use frequency of respective apparatuses, the use frequency according to the seasons, the use frequency according to the times, etc.

Figure 11:
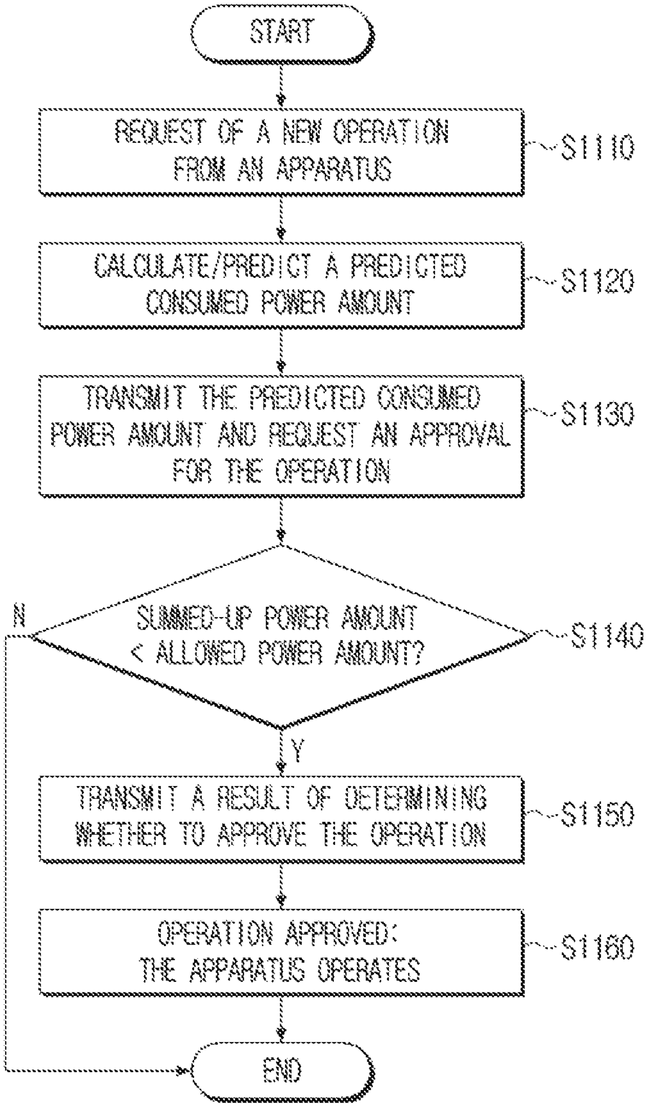
FIG. 11 is a flow chart illustrating a process of approving an operation of a new electronic apparatus according to an embodiment of the disclosure.

FIG. 11 is a flow chart illustrating a process of approving an operation of a new electronic apparatus according to an embodiment of the disclosure.

Referring to FIG. 11, the master electronic apparatus may receive a request for a new operation from a new electronic apparatus in operation S1110. The new electronic apparatus may calculate or predict a predicted consumed power amount for the new operation in operation S1120, and transmit the predicted consumed power amount to the master electronic apparatus and request an approval for the operation in operation S1130.

The master electronic apparatus may receive the predicted consumed power amount for the new operation from the new electronic apparatus. The master electronic apparatus may calculate a summed-up value (a summed-up power amount) of the predicted consumed power amount of the existing apparatus and the predicted consumed power amount of the new apparatus, and compare it with the power amount limit (the allowed power amount). In case the summed-up power amount is greater than or equal to the allowed power amount in operation S1140-N, the master electronic apparatus may not approve the operation of the new electronic apparatus. In case the summed-up power amount is smaller than the allowed power amount in operation S1140-Y, the master electronic apparatus may transmit a result of determining whether to approve the operation to the new electronic apparatus in operation S1150. The new electronic apparatus may perform the operation based on the transmitted result of determining whether to approve the operation in operation S1160.

Meanwhile, in a system wherein a plurality of electronic apparatuses are connected in a network in an equal relation without a master electronic apparatus, a new electronic apparatus may perform a process similar to the aforementioned operation approval process.

Figure 12:
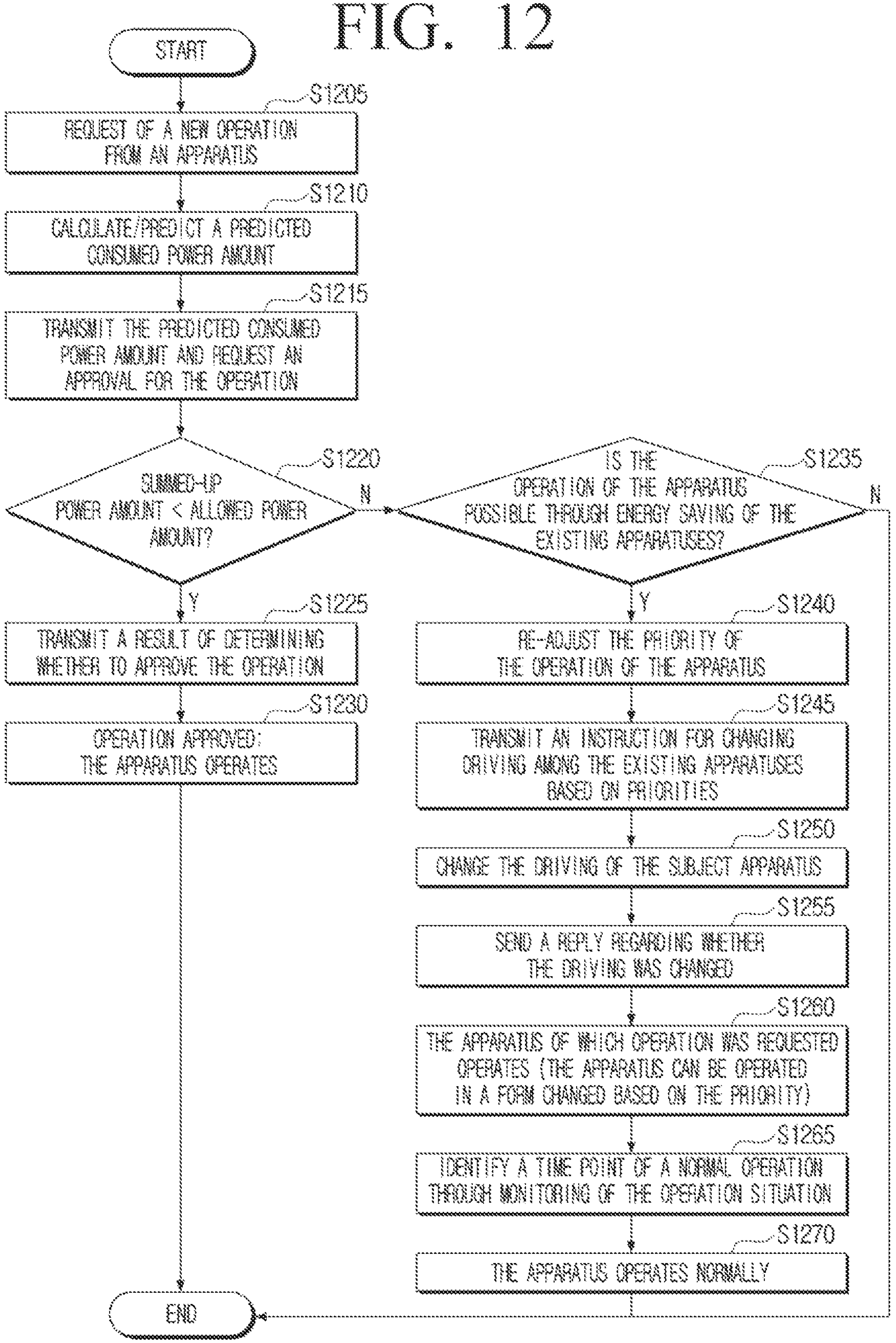
FIG. 12 is a flow chart illustrating a process of controlling an operation of an existing electronic apparatus performing a task according to an embodiment of the disclosure.

FIG. 12 is a flow chart illustrating a process of controlling an operation of an existing electronic apparatus performing a task according to an embodiment of the disclosure.

Referring to FIG. 12, the master electronic apparatus may receive a request for a new operation from a new electronic apparatus in operation S1205. The new electronic apparatus may calculate or predict a predicted consumed power amount for the new operation in operation S1210, and transmit the predicted consumed power amount to the master electronic apparatus and request an approval for the operation in operation S1215.

The master electronic apparatus may receive the predicted consumed power amount for the new operation from the new electronic apparatus. The master electronic apparatus may calculate a summed-up value (a summed-up power amount) of the predicted consumed power amount of the existing apparatus and the predicted consumed power amount of the new apparatus, and compare it with the power amount limit (the allowed power amount). In case the summed-up power amount is smaller than the allowed power amount in operation S1220-Y, the master electronic apparatus may transmit a result of determining whether to approve the operation to the new electronic apparatus in operation S1225. The new electronic may perform the operation based on the transmitted result of determining whether to approve the operation in operation S1230.

In case the summed-up power amount is greater than or equal to the allowed power amount in operation S1220-N, the master electronic apparatus may determine whether the operation of the new electronic apparatus is possible through energy saving of the existing electronic apparatus. In case the operation of the new electronic apparatus is not possible through energy saving of the existing electronic apparatus in operation S1235-N, the master electronic apparatus may not approve the operation of the new electronic apparatus. For example, in the time wherein the summed-up power amount is greater than or equal to the allowed power amount, the master electronic apparatus may adjust the summed-up power amount according to change or delay of the operation of the existing electronic apparatus, and if the adjusted summed-up power amount is greater than or equal to the allowed power amount, the master electronic apparatus may not approve the operation of the new electronic apparatus.

In case the operation of the new electronic apparatus is possible through energy saving of the existing electronic apparatus in operation S1235-Y, the master electronic apparatus may re-adjust the priority of the existing electronic apparatus in operation S1240. For example, the master electronic apparatus may re-adjust the priority based on the user's tendency of use, etc., and the process of re-adjusting the priority may be omitted.

The master electronic apparatus may transmit a control signal for changing the operation of the existing electronic apparatus to the existing electronic apparatus based on the priority in operation S1245. The existing electronic apparatus may change the operation in operation S1250, and send a reply regarding whether the operation was changed to the master electronic apparatus in operation S1255. Then, the existing electronic apparatus may perform the operation as the changed operation in operation S1260. The master electronic apparatus may monitor the operation situation about the changed operation. The master electronic apparatus may identify a time point of a normal operation through the monitoring of the operation situation in operation S1265. That is, when the existing electronic apparatus is performing the changed operation, the master electronic apparatus may identify a time point wherein the power amount coincides with the adjusted predicted consumed power amount (or, a time point wherein the power amount is within a predetermined threshold value). The master electronic apparatus may transmit a result of determining whether to approve the operation to the new electronic apparatus on the identified time point of the normal operation to the new electronic apparatus, and the new electronic apparatus may perform the operation in operation S1270.

Meanwhile, in a system wherein a plurality of electronic apparatuses are connected in an equal relationship in a network without a master electronic apparatus, the new electronic apparatus may perform a process similar to the aforementioned process of approving an operation.

The controlling method of a master electronic apparatus or a controlling method of an electronic apparatus according to the aforementioned various embodiments may also be provided as a computer program product. A computer program product may include an S/W program itself, or a non-transitory computer readable medium having an S/W program stored therein.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Also, while preferred embodiments of the disclosure have been shown and described so far, but the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A master electronic apparatus comprising:

a communication interface; and a processor configured to:

receive, through the communication interface, first data regarding predicted power consumption amounts for respective tasks of a first electronic apparatus and second data regarding predicted power consumption amounts for respective tasks of a second electronic apparatus which are expected to be newly performed, calculate summed-up values of the predicted power consumption amounts for respective times based on the first data and the second data, and compare the summed-up values with instantaneous power amount limits for the respective times which are maximum power amounts allowed to be consumed in the respective times, control the communication interface to transmit, based on the summed-up values being smaller than the instantaneous power amount limits in entire times, a task approval signal to the second electronic apparatus through the communication interface, and control the communication interface to transmit, based on identifying a time wherein a summed-up value is greater than or equal to an instantaneous power amount limit, at least one of:

a control signal to change a type of a task of the first electronic apparatus expected to be performed in the identified time, a control signal to delay the task of the first electronic apparatus, or a control signal to disapprove a task of the second electronic apparatus expected to be performed in the identified time, to at least one of the first electronic apparatus and the second electronic apparatus based on priorities, so to, for the identified time, adjust the summed-up value that is greater than or equal to the instantaneous power amount limit, to be less than the instantaneous power amount limit of the identified time, by at least one of changing the type of the task of the first electronic apparatus expected to be performed in the identified time, delaying the task of the first electronic apparatus, or disapproving the task of the second electronic apparatus expected to be performed in the identified time.

2. The master electronic apparatus of claim 1, wherein the processor is configured to:

based on a priority of a task among the respective tasks of the first electronic apparatus being a lower priority in the identified time while the summed-up value is greater than or equal to the instantaneous power amount limit, transmit a first control signal changing, with respect to the first electronic apparatus, the type of the task to a low power task or a second control signal delaying the task through the communication interface.

3. The master electronic apparatus of claim 2, wherein the processor is configured to:

adjust the summed-up value according to change or delay of the task of the first electronic apparatus in the identified time while the summed-up value is greater than or equal to the instantaneous power amount limit, and based on the adjusted summed-up value being greater than or equal to the instantaneous power amount limit, transmit a signal disapproving a task for the second electronic apparatus through the communication interface.

4. The master electronic apparatus of claim 1, wherein the processor is configured to:

set the priorities based on information associated with at least one item among a use cycle, an average use time, whether a user is involved, whether health is related, a degree of use of a power amount, a current time, usability in a next time, or a user's tendency of use.

5. The master electronic apparatus of claim 4, wherein the processor is configured to:

set the priorities based on information associated with the user's tendency of use including at least one item among a use frequency of respective apparatuses, a use frequency according to seasons, and a use frequency according to times.

6. An electronic apparatus comprising:

a communication interface to communicate with an external apparatus performing a first of plurality of tasks; and a processor configured to:

receive first data regarding predicted power consumption amounts for the first of the plurality of tasks from the external apparatus through the communication interface, identify second data regarding predicted power consumption amounts for second of plurality of tasks which the electronic apparatus is enabled to perform, calculate summed-up values of the predicted power consumption amounts for respective times based on the first data and the second data, and compare the summed-up values with instantaneous power amount limits for the respective times which are maximum power amounts allowed to be consumed in the respective times, control the communication interface to transmit, based on the summed-up values being smaller than the instantaneous power amount limits in entire times, a task approval signal to the external apparatus through the communication interface, and control the communication interface to transmit, based on identifying a time wherein a summed-up value is greater than or equal to an instantaneous power amount limit, at least one of a control signal to change a type of a task of the external electronic apparatus expected to be performed in the identified time or a control signal to delay the task of the external electronic apparatus expected to be performed in the identified time to the external apparatus based on priorities, so to, for the identified time, adjust the summed-up value that is greater than or equal to the instantaneous power amount limit, to be less than the instantaneous power amount limit of the identified time, by at least one of changing the type of the task of the external electronic apparatus expected to be performed in the identified time or delaying the task of the external electronic apparatus expected to be performed in the identified time.

7. The electronic apparatus of claim 6, wherein the processor is configured to:

based on a priority of a task among the plurality of tasks of the external apparatus being a lower priority in the identified time while the summed-up value is greater than or equal to the instantaneous power amount limit, transmit a first control signal changing, with respect to the external apparatus, a type of the task to a low power task or a second control signal delaying the task through the communication interface.

8. The electronic apparatus of claim 7, wherein the processor is configured to:

adjust the summed-up value according to change or delay of the task of the external apparatus in the identified time while the summed-up value is greater than or equal to the instantaneous power amount limit, and based on the adjusted summed-up value being greater than or equal to the instantaneous power amount limit, prohibit performing of the task.

9. The electronic apparatus of claim 6, wherein the processor is configured to:

set the priorities based on information associated with at least one item among a use cycle, an average use time, whether a user is involved, whether health is related, a degree of use of a power amount, a current time, usability in a next time, and a user's tendency of use.

10. The electronic apparatus of claim 9, wherein the processor is configured to:

set the priorities based on information associated with the user's tendency of use including at least one item among a use frequency of respective apparatuses, a use frequency according to seasons, and a use frequency according to times.

11. A method of controlling a master electronic apparatus, the method comprising:

receiving first data regarding predicted power consumption amounts for respective tasks of a first electronic apparatus and second data regarding predicted power consumption amounts for respective tasks of a second electronic apparatus which are expected to be newly performed;

calculating summed-up values of the predicted power consumption amounts for respective times based on the first data and the second data, and comparing the summed-up values with instantaneous power amount limits which are maximum power amounts allowed to be consumed in the respective times;

control transmitting of, based on the summed-up values being smaller than the instantaneous power amount limits in entire times, a task approval signal to the second electronic apparatus; and control transmitting of, based on identifying a time wherein a summed-up value is greater than or equal to an instantaneous power amount limit, at least one of a control signal to change a type of a task of the first electronic apparatus expected to be performed in the identified time, a control signal to delay the task of the first electronic apparatus, or a control signal to disapprove a task of the second electronic apparatus expected to be performed in the identified time to at least one of the first electronic apparatus and the second electronic apparatus based on priorities, so to adjust the summed-up value that is greater than or equal to the instantaneous power amount limit, to be less than the instantaneous power amount limit of the identified time, by at least one of changing the type of the task of the first electronic apparatus expected to be performed in the identified time, delaying the task of the first electronic apparatus, or disapproving the task of the second electronic apparatus expected to be performed in the identified time.

12. The method of controlling the master electronic apparatus of claim 11, wherein the transmitting comprises:

based on a priority of a task among the respective tasks of the first electronic apparatus being a lower priority in the identified time while the summed-up value is greater than or equal to the instantaneous power amount limit, transmitting a first control signal changing, with respect to the first electronic apparatus, a type of the task to a low power task or a second control signal delaying the task.

13. The method of controlling the master electronic apparatus of claim 12, wherein the transmitting comprises:

adjusting the summed-up value according to change or delay of the task of the first electronic apparatus in the identified time while the summed-up value is greater than or equal to the instantaneous power amount limit, and based on the adjusted summed-up value being greater than or equal to the instantaneous power amount limit, transmitting a signal disapproving a task for the second electronic apparatus.

14. The method of controlling the master electronic apparatus of claim 11, wherein the priorities are set based on information associated with at least one item among a use cycle, an average use time, whether a user is involved, whether health is related, a degree of use of a power amount, a current time, usability in a next time, or a user's tendency of use.

15. The method of controlling the master electronic apparatus of claim 14, wherein the priorities are set based on information associated with the user's tendency of use including at least one item among a use frequency of respective apparatuses, a use frequency according to seasons, and a use frequency according to times.

* * * * *